United States Patent [19]
Nakamura et al.

[11] Patent Number: 5,807,259
[45] Date of Patent: Sep. 15, 1998

[54] ULTRASONIC CONTINUOUS WAVE DOPPLER BLOOD FLOW-METER

[75] Inventors: Yasuhiro Nakamura, Kanagawa-ken; Hisashi Akiyama, Yokohama; Sueo Baba, Sagamihara, all of Japan

[73] Assignee: Matsushita Electric Industrial Co., Ltd., Osaka, Japan

[21] Appl. No.: 804,915

[22] Filed: Feb. 24, 1997

[30] Foreign Application Priority Data

May 14, 1996 [JP] Japan .................................. 8-119179

[51] Int. Cl.$^6$ ........................................................ A61B 8/00
[52] U.S. Cl. ............................................................ 600/457
[58] Field of Search ........................ 128/661.07–661.09, 128/662.01; 600/454–457

[56] References Cited

U.S. PATENT DOCUMENTS

| | | | |
|---|---|---|---|
| 4,434,669 | 3/1984 | Roberts et al. | 128/662.01 X |
| 4,622,978 | 11/1986 | Matsuo et al. | 128/662.01 X |
| 4,924,869 | 5/1990 | Takeuchi et al. | 128/662.01 X |
| 5,406,949 | 4/1995 | Yao et al. | 128/662.01 |
| 5,562,097 | 10/1996 | Yao | 128/662.01 |

FOREIGN PATENT DOCUMENTS 63-315037  12/1988  Japan .

*Primary Examiner*—Francis Jaworski
*Attorney, Agent, or Firm*—Stevens, Davis, Miller & Mosher, L.L.P.

[57] ABSTRACT

An ultrasonic continuous wave doppler blood flow-meter deflects an ultrasonic continuous wave to an arbitrary angle and transmits it into an organism, thereby measuring a blood flow speed of the organism. Two continuous sine wave signals of different phases and a plurality of sets of pairs of coefficients are generated. One of each of the pairs of coefficients is multiplied to one of the two sine wave signals. The other one of each of the pairs of coefficients is multiplied to the other one of the two sine wave coefficients. After that, two sine wave signals after the multiplication are added, so that a plurality of synthesis sine wave signals are generated. When a plurality of micro vibrators are driven by the plurality of synthesis sine wave signals, the ultrasonic continuous wave is deflected to an arbitrary angle and is transmitted into the organism.

11 Claims, 6 Drawing Sheets

ULTRASONIC CONTINUOUS WAVE DOPPLER BLOOD FLOW-METER

BACKGROUND OF THE INVENTION

1. Field of the Invention

The invention relates to an ultrasonic continuous wave doppler blood flow-meter for deflecting an ultrasonic continuous wave to an arbitrary angle and transmitting it into an organism, thereby measuring a blood flow speed of the organism.

2. Description of the Related Art

An ultrasonic continuous wave doppler blood flow-meter measures a blood flow speed or the like of an organism by using an ultrasonic continuous wave. A main stream of a blood flow-meter of a doppler type using an ultrasonic continuous wave is called a steerable continuous wave blood flow-meter. By using an array probe comprising a plurality of micro vibrators, ultrasonic continuous waves are transmitted from a micro vibrator group for transmission and echo signals are received by a micro vibrator group for reception. According to such an ultrasonic continuous wave blood flow-meter, by giving a delay time to a transmission/reception signal, not only the transmission/reception signal can be deflected in an arbitrary direction but also it can be commonly used in both of a B mode and a pulse doppler mode by the same group. Therefore, an observing portion can be identified to a certain degree.

Hitherto, as such an ultrasonic continuous wave doppler blood flow-meter, a flow-meter disclosed in JP-A-63-315037 is known. As shown in FIG. 1, the ultrasonic continuous wave doppler blood flow-meter has: an ultrasonic probe 21 constructed by a plurality of micro vibrators 21a–21h for transmission for transmitting ultrasonic continuous waves to an object to be examined (organism) and a plurality of micro vibrators 21i–21p for reception for receiving ultrasonic continuous waves (echo signals) reflected from the object to be examined; reference signal generating means 22 for generating a clock signal of a predetermined frequency; a frequency divider 24 for frequency dividing the clock signal from the reference signal generating means 22; a 90° phase shifter 23 for delaying the clock signal, by 90°, which was frequency divided by the frequency divider 24; delay means 25 for generating a plurality of continuous wave transmission signals each having a delay time according to a deflection angle and a convergence distance of the ultrasonic continuous wave to be transmitted by using the clock signal from the reference signal generating means 22; and driving means 27 for amplifying the plurality of continuous wave transmission signals from the delay means 25 to drive the micro vibrators 21a–21h for transmission of the ultrasonic probe 21, respectively. The ultrasonic continuous wave doppler blood flow-meter further has: delay adding means 28 for respectively delaying the plurality of echo signals received by the micro vibrators 21i–21p for reception of the ultrasonic probe 21 in accordance with their deflection angles and convergence states and, thereafter, adding the plurality of delayed echo signals; an orthogonal detector 29 for detecting a doppler signal from an echo signal after completion of the addition from the delay adding means 28 by using the clock signal and an output signal of the 90° phase shifter 23; a frequency analyzer 30 for performing a frequency analysis with respect to an output signal of the orthogonal detector 29; and display means 31 for displaying an analysis result of the frequency analyzer 30.

According to the ultrasonic continuous wave doppler blood flow-meter, the clock signal generated by the reference signal generating means 22 is inputted to the delay means 25. By using the clock signal, the delay means 25 generates a plurality of continuous wave transmission signals each having the delay time according to the deflection angle and convergence distance of the ultrasonic continuous wave to be transmitted. Namely, in the delay means 25, the continuous waves are accurately generated by digital circuits such as counter, shift register, and the like. After the plurality of continuous wave transmission signals to be generated from the delay means 25 are amplified by the driving means 27, they are inputted to the micro vibrators 21a–21h for transmission of the ultrasonic probe 21. Thus, the micro vibrators 21a–21h for transmission are driven and the ultrasonic continuous waves are transmitted.

The echo signals which are respectively received by the micro vibrators 21i–21p for reception of the ultrasonic probe 21 are respectively delayed in accordance with their deflection angles and convergence states and, after that, they are added by the delay adding means 28. The echo signal after completion of the addition that is outputted from the delay adding means 28 is orthogonal-detected by the orthogonal detector 29, so that the doppler signal is detected. The detected doppler signal is frequency analyzed by the frequency analyzer 30 and the analysis result of the frequency analyzer 30 is displayed by the display means 31.

In such an ultrasonic continuous wave doppler blood flow-meter, a dynamic range of a reception system is important. As one of factors which exert an influence on the dynamic range of the reception system, a factor such that the continuous wave transmission signals to drive the ultrasonic probe 21 for the purpose of transmission are directly mixed into the reception system can be mentioned. In the foregoing ultrasonic continuous wave doppler blood flow-meter, however, since a rectangular wave signal (continuous wave transmission signal generated by using the clock signal as it is) is used as a continuous wave transmission signal, when a harmonic component of the rectangular wave signal is mixed into the reception system, the dynamic range of the reception system deteriorates. There is, consequently, a problem such that when a blood flow around a strong echo is measured, a doppler signal cannot intermittently be obtained.

SUMMARY OF THE INVENTION

It is an object of the invention to provide an ultrasonic continuous wave doppler blood flow-meter in which a deflecting precision of an ultrasonic continuous wave is high and a dynamic range is wide.

According to a first ultrasonic continuous wave doppler blood flow-meter of the invention, there is provided an ultrasonic continuous wave doppler blood flow-meter for deflecting an ultrasonic continuous wave to an arbitrary angle and transmitting it into an organism, thereby measuring a blood flow speed of the organism, comprising:

sine wave signal generating means for generating two continuous sine wave signals of different phases;

coefficient generating means for generating a plurality of sets of pairs of coefficients;

synthesis sine wave signal generating means for multiplying one of each of the pairs of coefficients to one of the two sine wave signals, multiplying the other one of each of the pairs of coefficients to the other one of the two sine wave signals, and for adding the two sine wave signals after the multiplication, thereby generating a plurality of synthesis sine wave signals; and a plurality of micro vibrators driven by the plurality of synthesis sine wave signals, each of the micro vibrators deflecting the ultrasonic continuous wave to an arbitrary angle and transmitting the wave into the organism.

According to a second ultrasonic continuous wave doppler blood flow-meter of the invention, there is provided an ultrasonic continuous wave doppler blood flow-meter for deflecting an ultrasonic continuous wave to an arbitrary angle, transmitting it into an organism, thereby measuring a blood flow speed of the organism, comprising:

sine wave signal generating means for generating two continuous sine wave signals of different phases;

synthesis sine wave signal generating means, having a plurality of sets of pairs of fixed coefficients, for multiplying one of each of the pairs of fixed coefficients to one of the two sine wave signals, multiplying the other one of each of the pairs of fixed coefficients to the other one of the two sine wave signals, and for adding the two sine wave signals after the multiplication, thereby generating a plurality of synthesis sine wave signals;

switching means having a plurality of switches each for selecting any one of the plurality of synthesis sine wave signals in accordance with a deflection and a converging state of the ultrasonic continuous wave to be transmitted; and a plurality of micro vibrators driven by the plurality of synthesis sine wave signals selected by the switching means, each of the micro vibrators deflecting the ultrasonic continuous wave to an arbitrary angle and transmitting the wave into the organism.

DESCRIPTION OF THE PREFERRED EMBODIMENTS

Figure 1:
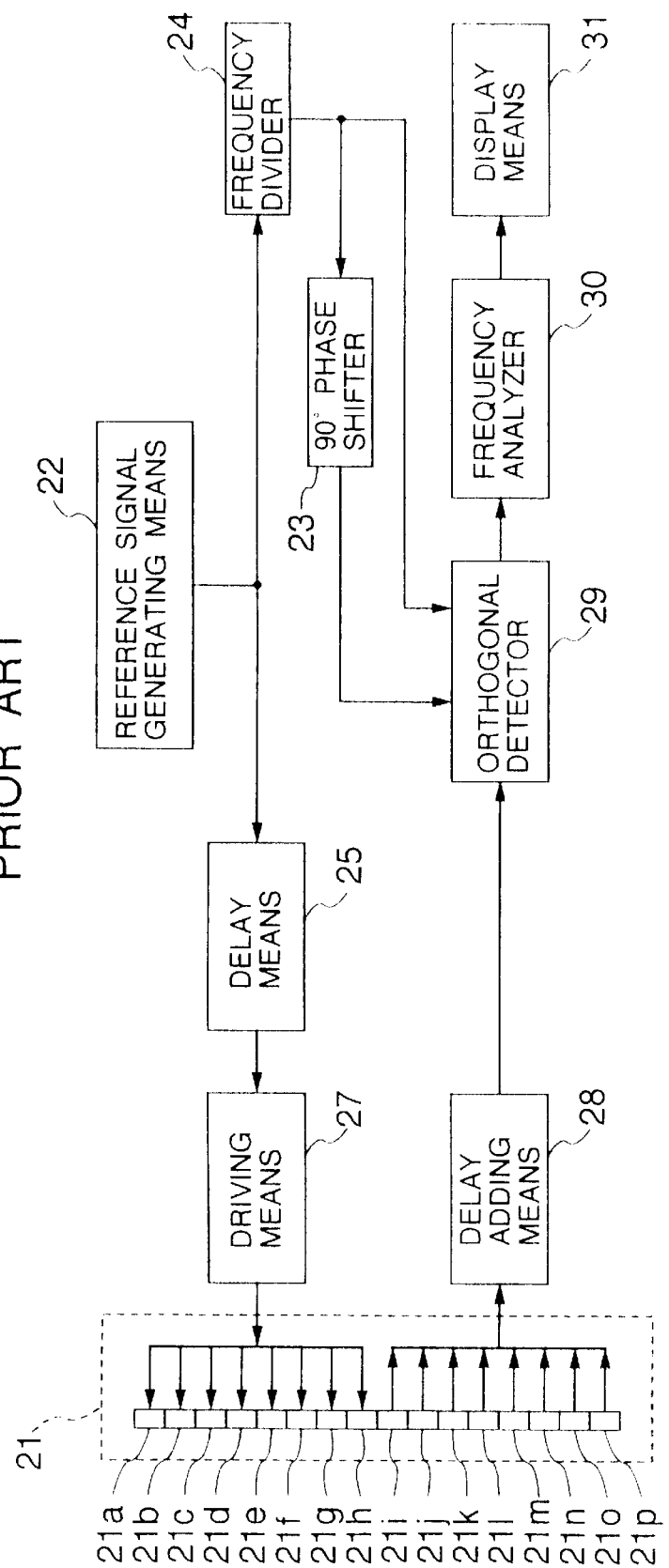
FIG. 1 is a block diagram showing a construction of an example of a conventional ultrasonic continuous wave doppler blood flow-meter.
Figure 2:
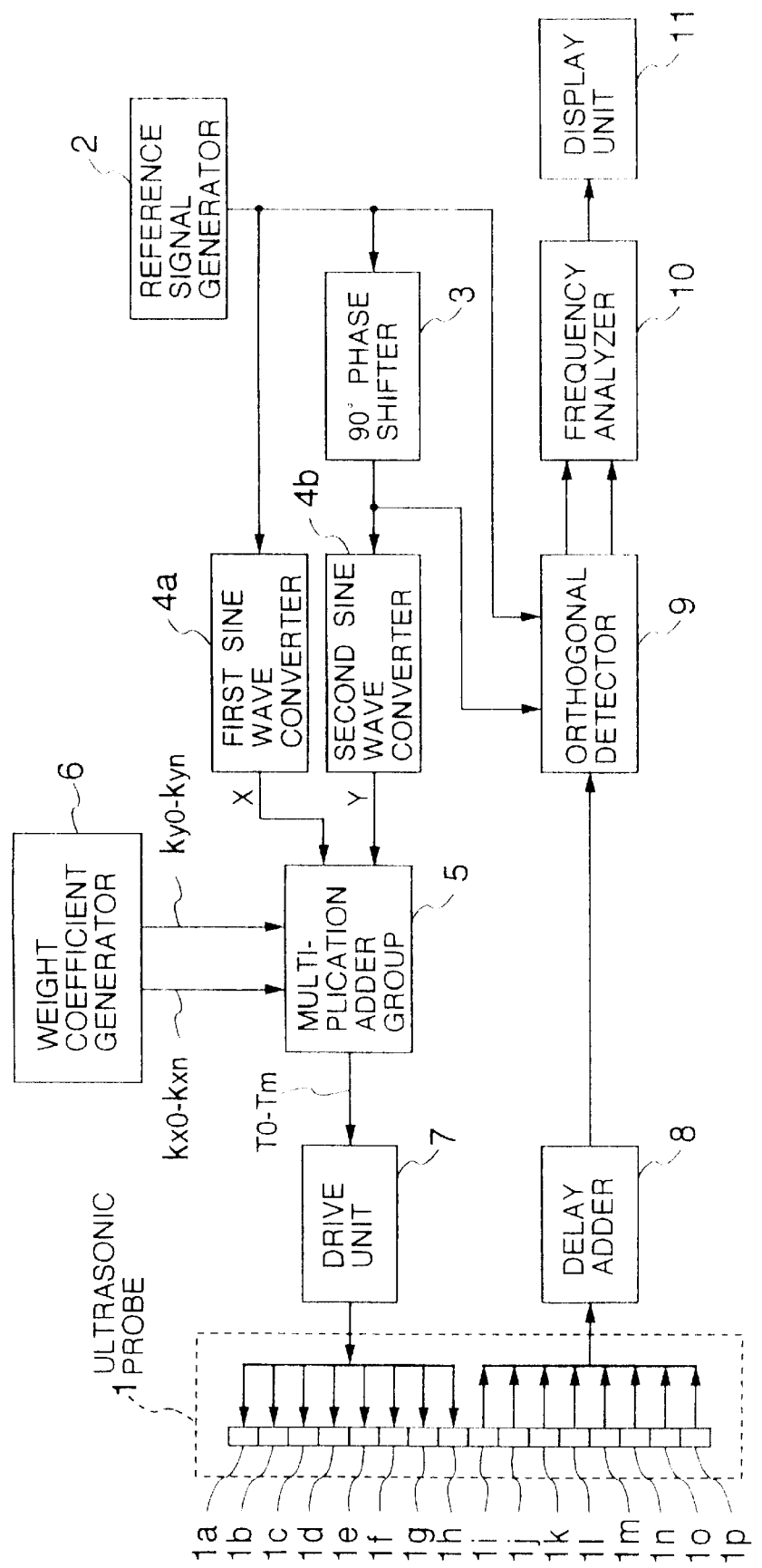
FIG. 2 is a block diagram showing a construction of an ultrasonic continuous wave doppler blood flow-meter according to the first embodiment of the invention.

As shown in FIG. 2, as a transmission system, an ultrasonic continuous wave doppler blood flow-meter according to the first embodiment of the invention has: an ultrasonic probe 1 constructed by a plurality of transmitting micro vibrators 1a–1h for transmitting ultrasonic continuous waves to an object to be examined (organism) and a plurality of micro receiving vibrators 1i–1p for receiving ultrasonic continuous waves (echo signals) reflected from the object to be examined; a reference signal generator 2 for generating a clock signal of a predetermined frequency; a 90° phase shifter 3 for delaying the clock signal from the reference signal generator 2 by 90°; a first sine wave converter 4a for converting the clock signal from the reference signal generator 2 into a first sine wave signal X; a second sine wave converter 4b for converting the clock signal which is delayed by the 90° phase shifter 3 by 90° into a second sine wave signal Y; a weight coefficient generator 6 for generating a plurality of first coefficients $k_{xo}$–$k_{xn}$ for the first sine wave signal X and a plurality of second coefficients $k_{yo}$–$k_{yn}$ for the second sine wave signal Y; and a multiplication adder group 5 comprising a plurality of multiplication adders.

Figure 3A:
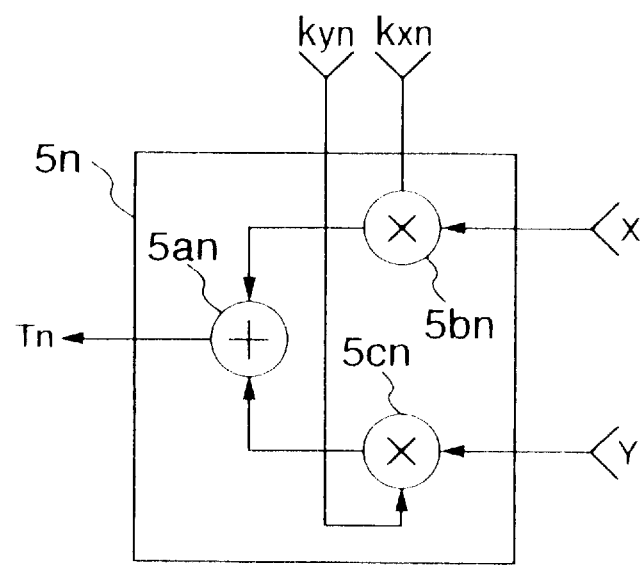
FIGS. 3A and 3B are diagrams for explaining a construction of an adder shown in FIG. 1.
Figure 3B:
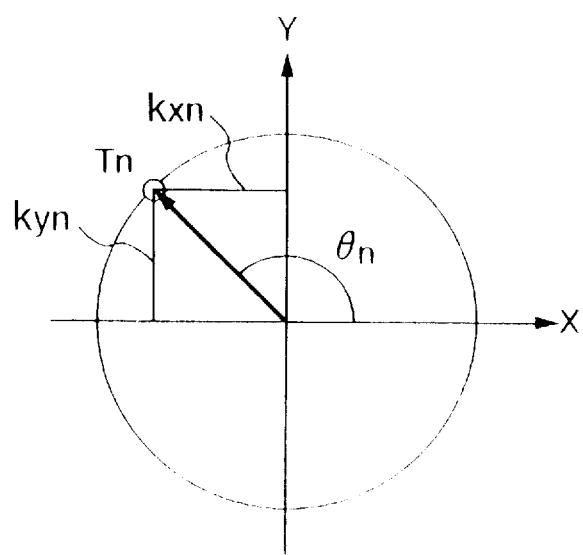

As shown in FIGS. 3A and 3B, each multiplication adder constructing the multiplication adder group 5 has: a first multiplier 5bn for performing a multiplication of the first coefficient $k_{xn}$ and the first sine wave signal X; a second multiplier 5cn for performing a multiplication of the second coefficient $k_{yn}$ and the second sine wave signal Y; and an adder 5an for adding an output signal of the first multiplier 5bn and an output signal of the second multiplier 5cn to output a synthesis sine wave signal $T_n$. Each of the first coefficient $k_{xn}$ and the second coefficient $k_{yn}$ is generated by the weight coefficient generator 6 in accordance with the following equations.

$$k_{xn} = \cos \theta_n \quad (1)$$

$$k_{yn} = \sin \theta_n \quad (2)$$

Therefore, since the synthesis sine wave signal $T_n$ which is outputted from the adder 5an has a phase as shown in FIG. 3B, in case of changing the phase of the synthesis sine wave signal $T_n$, it is sufficient to change at least one of the first coefficient $k_{xn}$ and the second coefficient $k_{yn}$.

As shown in FIG. 2, as a transmission system, the ultrasonic continuous wave doppler blood flow-meter according to the embodiment further has a drive unit 7 comprising a plurality of drive amplifiers for respectively amplifying a plurality of synthesis sine wave signals $T_0$–$T_n$ from the multiplication adder group 5 and respectively driving the micro vibrators 1a–1h for transmission.

As a reception system, the ultrasonic continuous wave doppler blood flow-meter of the embodiment has: a delay adder 8 for respectively delaying a plurality of echo signals received by the micro vibrators 1i–1p for reception of the ultrasonic probe 1 in accordance with their deflection angles and converging states and, after that, adding the plurality of delayed echo signals; an orthogonal detector 9 for orthogonal-detecting the echo signal after completion of the addition from the delay adder 8 by the clock signal from the reference signal generator 2 and the clock signal, which is delayed by 90° and is generated from the 90° phase shifter 3, to detect a doppler signal; a frequency analyzer 10 for frequency analyzing the doppler signal from the orthogonal detector 9; and a display unit 11 for displaying an analysis result of the frequency analyzer 10.

The operation of the ultrasonic continuous wave doppler blood flow-meter of the embodiment will now be described.

The reference signal generator 2 is constructed by a generator such as a quartz oscillator or the like for generating a clock signal of a predetermined frequency of a high precision. Two clock signals of rectangular waves whose phases are different from each other by 90° are generated by the reference signal generator 2 and 90° phase shifter 3. In the first and second sine wave converters 4a, 4b, harmonic components of the clock signal from the reference signal generator 2 and the clock signal from the 90° phase shifter 3 are removed by filters, respectively. Thus, the above two clock signals become the first and second sine wave signals X, Y whose phases are different from each other by 90°.

In the adder group 5, the processes as mentioned above are executed by using the first and second sine wave signals X, Y and the first and second coefficients $k_{xo}$–$k_{xn}$, $k_{yo}$–$k_{yn}$, so that a plurality of synthesis sine wave signals $T_0$–$T_n$ are generated. The plurality of synthesis sine wave signals $T_0$–$T_n$ are generated so as to have different phases, respectively. After the plurality of synthesis sine wave signals $T_0$–$T_n$ are amplified by the drive unit 7, they are supplied to the micro vibrators 1a–1h for transmission of the ultrasonic probe 1, respectively. Thus, the micro vibrators 1a–1h for transmission are driven and the ultrasonic continuous waves are irradiated toward the object to be examined.

The echo signals from the object to be examined which are respectively received by the micro vibrators 1i–1p for reception of the ultrasonic probe 1 are respectively delayed in accordance with their deflection angles and converging states and, after that, they are added by the delay adder 8. The echo signal after completion of the addition which is outputted from the delay adder 8 is orthogonal-detected by the orthogonal detector 9, so that a doppler signal is detected. The detected doppler signal is frequency analyzed by the frequency analyzer 10 and an analysis result of the frequency analyzer 10 is displayed by the display unit 11.

As mentioned above, in the ultrasonic continuous wave doppler blood flow-meter of this embodiment, since the ultrasonic continuous wave is generated by using the sine wave signal from which the harmonic component of the clock signal generated from the reference signal generator 2 was removed, the harmonic component is not mixed from the transmission system into the reception system. A deterioration in dynamic range of the reception system can be prevented.

Figure 4:
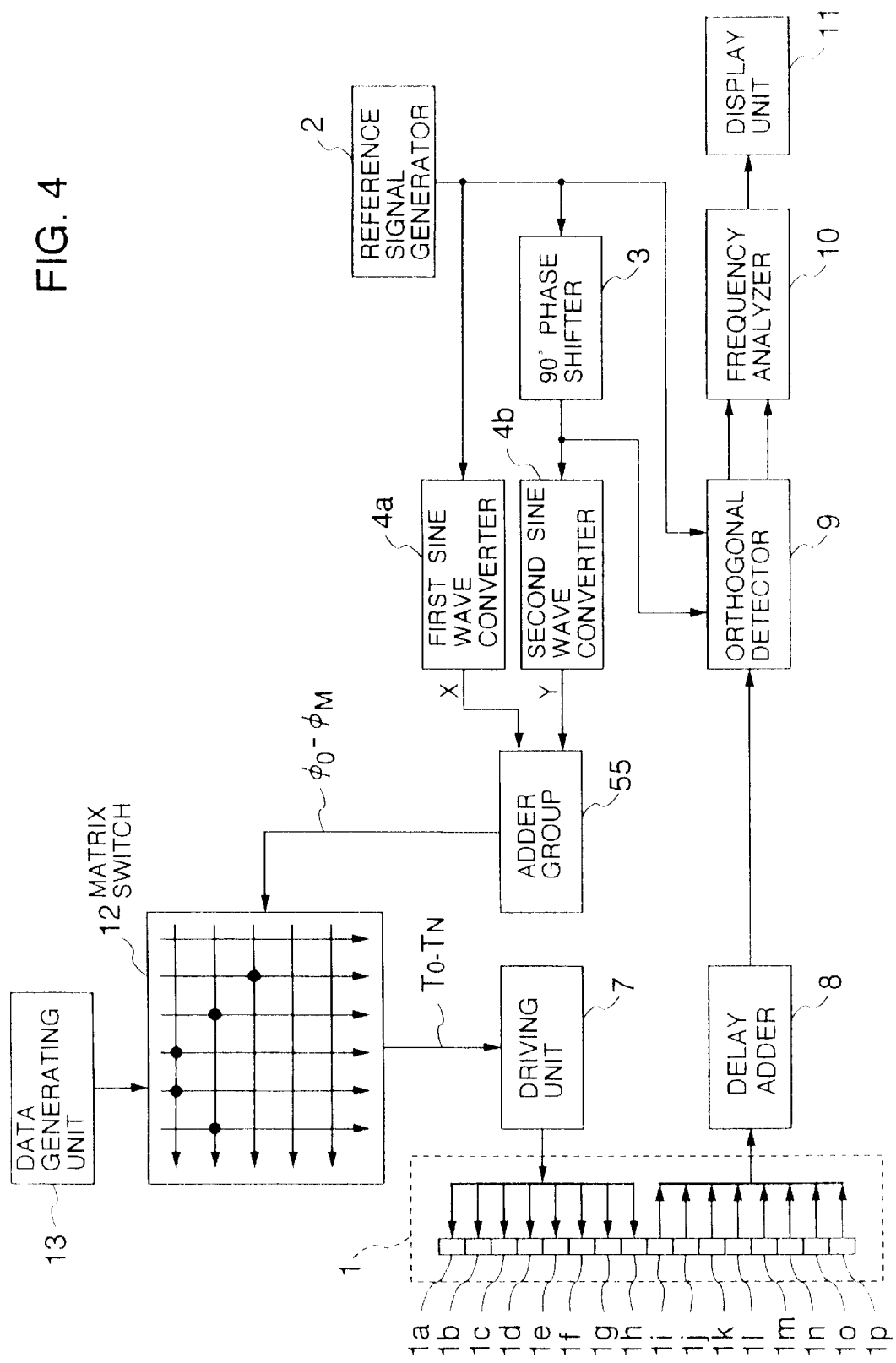
FIG. 4 is a block diagram showing a construction of an ultrasonic continuous wave doppler blood flow-meter according to the second embodiment of the invention.

As shown in FIG. 4, an ultrasonic continuous wave doppler blood flow-meter according to the second embodiment of the invention differs from the ultrasonic continuous wave doppler blood flow-meter according to the first embodiment of the invention shown in FIG. 2 with respect to the following points.

(a) Each of (M+1) adders constructing an adder group 55 applies fixed weights to the first and second sine wave signals X, Y from the first and second sine wave converters 4a, 4b and, after that, adds them. Thus, (M+1) synthesis sine wave signals $\phi_0$–$\phi_M$ whose phases are deviated at regular intervals are generated.

(b) A matrix switch 12 for converting the (M+1) synthesis sine wave signals $\phi_0$–$\phi_M$ from the adder group 55 into a plurality of synthesis sine wave signals $T_0$–$T_n$ is provided between the adder group 55 and the drive unit 7.

(c) A data generating unit 13 for generating connection data to decide a connecting state of the matrix switch 12 is provided.

Figure 5A:
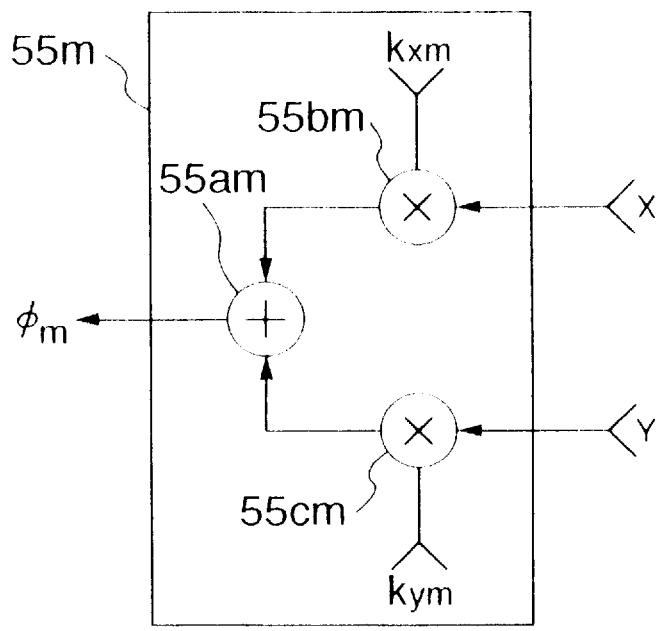
FIGS. 5A and 5B are diagrams for explaining a construction of an adder shown in FIG. 4.
Figure 5B:
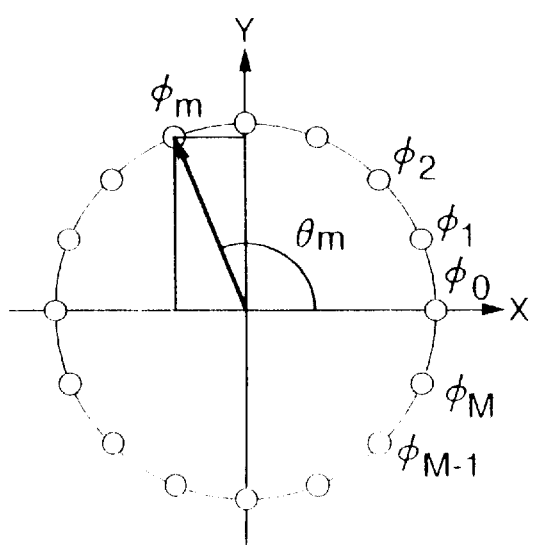

Namely, as shown in FIG. 5A, an m-th adder 55m constructing the adder group 55 has: a first multiplier 55bm for performing a multiplication of the first sine wave signal X from the first sine wave converter 4a and a first fixed coefficient $K_{xm}$; a second multiplier 55cm for executing a multiplication of the second sine wave signal Y from the second sine wave converter 4b and a second fixed coefficient $K_{ym}$; and an adder 55am for adding an output signal of the first multiplier 55bm and an output signal of the second multiplier 55cm. An m-th synthesis sine wave signal $\phi_m$ is generated from the adder 55am. The first fixed coefficient $K_{xm}$ and the second fixed coefficient $K_{ym}$ are determined by the following equations.

$$k_{xm} = \cos \theta_m \tag{3}$$

$$K_{ym} = \sin \theta_m \tag{4}$$

where, $$\theta_m = m \times 360°/(M+1)$$

As mentioned above, it is sufficient that the first and second multipliers 55bm, 55cm constructing the adder 55m execute multiplications of the fixed coefficients and the sine wave signals. There is no need to have an analogwise multiplying function, and it is sufficient to use a fixed amplifier whose gain is equal to the fixed coefficient.

The operation of the ultrasonic continuous wave doppler blood flow-meter of the embodiment will now be described.

The reference signal generator 2 is constructed by a generator such as a quartz oscillator or the like for generating a clock signal of a predetermined frequency of a high precision. Two clock signals of rectangular waves whose phases are different from each other by 90° are generated from the reference signal generator 2 and the 90° phase shifter 3. In the first and second sine wave converters 4a, 4b, harmonic components of the clock signal from the reference signal generator 2 and the clock signal from the 90° phase shifter 3 are respectively removed by filters. Thus, the two clock signals become the first and second sine wave signals X, Y whose phases are different from each other by 90°.

In the adder group 55, since the processes as mentioned above are executed by using the first and second sine wave signals X, y and the first and second fixed coefficients $K_{x0}$–$K_{xM}$, $k_{y0}$–$k_{yM}$, (M+1) synthesis sine wave signals $\phi_0$–$\phi_M$ are generated. The (M+1) synthesis sine wave signals $\phi_0$–$\phi_M$ are respectively generated so as to have phase differences at regular intervals. The (M+1) synthesis sine wave signals $\phi_0$–$\phi_M$ are converted into a plurality of synthesis sine wave signals $T_0$–$T_n$ by the matrix switch 12, respectively. Such a conversion is executed by closing contact switches of the matrix switch 12 in accordance with data that is generated by the data generating unit 13 (in FIG. 4, closed switches are shown by black points).

Figure 6:
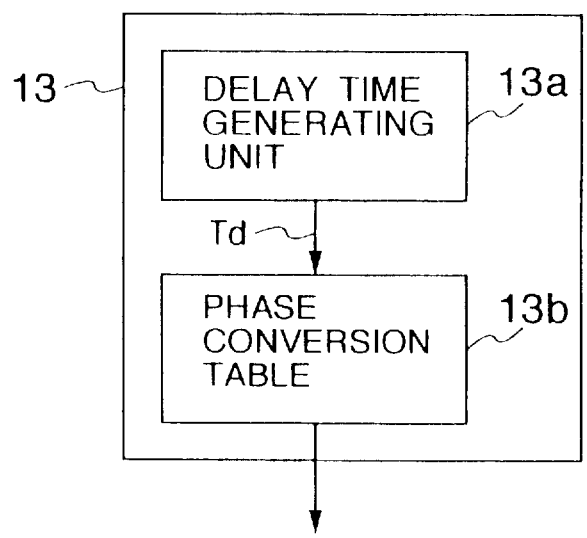
FIG. 6 is a block diagram showing a construction of a data generating circuit shown in FIG. 4.

As shown in FIG. 6, the data generating unit 13 has: a delay time generating unit 13a for calculating a delay time Td in accordance with a deflection and a converging state of the ultrasonic wave to be transmitted; and a phase conversion table 13b for converting the delay time Td generated by the delay time generating unit 13a into a phase $\phi$ of the ultrasonic wave to be transmitted on the basis of the following relational equation.

$$\phi = 2\pi f \cdot Td \tag{5}$$

where, f: frequency of the ultrasonic wave to be transmitted (first and second sine wave signals X, Y)

As mentioned above, by converting the delay time Td generated by the delay time generating unit 13a into the phase $\phi$ on the basis of the phase conversion table 13, data to be outputted to the matrix switch 12 can be generated on the basis of the delay time Td calculated irrespective of the frequency of the ultrasonic wave to be transmitted.

The plurality of synthesis sine wave signals $T_0$–$T_n$ are respectively amplified by the drive unit 7 and, after that, they are supplied to the micro vibrators 1a–1h for transmission of the ultrasonic probe 1. Thus, the micro vibrators 1a–1h for transmission are driven and the ultrasonic continuous waves are irradiated toward the object to be examined. The echo signals from the object to be examined which are respectively received by the micro vibrators 1i–1p for reception of the ultrasonic probe 1 are respectively delayed in accordance with their deflection angles and converging states and, after that, they are added by the delay adder 8. The echo signal after completion of the addition which is outputted from the delay adder 8 is orthogonal-detected by the orthogonal detector 9, so that the doppler signal is detected. The detected doppler signal is frequency analyzed by the frequency analyzer 10 and an analysis result of the frequency analyzer 10 is displayed on the display unit 11.

As mentioned above, according to the ultrasonic continuous wave doppler blood flow-meter of the embodiment, since this transmission signal is generated by using the sine wave signal from which the harmonic component of the clock signal generated by the reference signal generator 2 is removed, the harmonic component is not mixed from the transmission system into the reception system and a deterioration in dynamic range of the reception system can be prevented. Since the synthesis sine wave signal is generated by using the fixed coefficient, a multiphase sine wave signal of a high precision can be generated by the amplifier of a fixed gain.

What is claimed is:

1. An ultrasonic continuous wave doppler blood flow-meter for deflecting an ultrasonic continuous wave to an arbitrary angle and transmitting said wave into an organism, thereby measuring a blood flow speed of said organism, comprising:

sine wave signal generating means for generating two continuous sine wave signals of different phases;

coefficient generating means for generating a plurality of sets of pairs of coefficients;

synthesis sine wave signal generating means for generating a plurality of synthesis sine wave signals by multiplying one of each of said pairs of coefficients to one of said two sine wave signals, for multiplying the other one of each of said pairs of coefficients to the other one of said two sine wave signals, and for adding said two sine wave signals after the multiplication; and a plurality of micro vibrators driven by said plurality of synthesis sine wave signals, each of said micro vibrators deflecting said ultrasonic continuous wave to an arbitrary angle and transmitting said wave into said organism.

2. A meter according to claim 1, wherein said sine wave signal generating means comprises a first sine wave signal generating unit for generating said one of said two sine wave signals and a second sine wave signal generating unit for generating said other one of said two sine wave signals, said other one of said two sine wave signals having a phase which is different from a phase of said one of said two sine wave signals by 90°.

3. A meter according to claim 1, wherein one of said pair of coefficients has a value which is calculated by $\cos\theta$ and the other one of said pair of coefficients has a value which is calculated by $\sin\theta$.

4. A meter according to claim 1, further comprising:

a plurality of receiving micro vibrators for respectively receiving echo signals as reflection waves from the inside of said organism of the ultrasonic continuous waves transmitted from said plurality of micro vibrators;

delay adding means for respectively delaying said plurality of received echo signals in accordance with their deflection angles and converging states and for adding said plurality of delayed echo signals;

detecting means for detecting an output signal of said delay adding means to detect a doppler signal; and frequency analyzing means for frequency analyzing said doppler signal.

5. An ultrasonic continuous wave doppler blood flow-meter for deflecting an ultrasonic continuous wave to an arbitrary angle and transmitting said wave into an organism, thereby measuring a blood flow speed in said organism, comprising:

sine wave signal generating means for generating two continuous sine wave signals of different phases;

synthesis sine wave signal generating means, having a plurality of sets of pairs of fixed coefficients, for multiplying one of each of said pairs of fixed coefficients to one of said two sine wave signals, for multiplying the other one of each of said pairs of fixed coefficients to the other one of said two sine wave signals, and for adding said two sine wave signals after the multiplication to generate a plurality of synthesis sine wave signals;

switching means having a plurality of switches each for selecting any one of said plurality of synthesis sine wave signals in accordance with a deflection and a converging state of said ultrasonic continuous wave to be transmitted; and a plurality of micro vibrators driven by said plurality of synthesis sine wave signals selected by said switching means, each of said micro vibrators deflecting said ultrasonic continuous wave to an arbitrary angle and transmitting said wave into said organism.

6. A meter according to claim 5, wherein said sine wave signal generating means comprises a first sine wave signal generating unit for generating said one of said two sine wave signals and a second sine wave signal generating unit for generating said other one of said two sine wave signals, said other one of said two one wave signals having a phase which is different from a phase of said one of said two sine wave signals by 90°.

7. A meter according to claim 6, wherein said switching means comprises:

delay time calculating means for calculating a delay time according to the deflection and the converging state of said ultrasonic continuous wave to be transmitted; and delay time-phase converting means for converting said calculated delay time into a phase of said ultrasonic continuous wave to be transmitted.

8. A meter according to claim 5, further comprising:

a plurality of micro receiving vibrators for respectively receiving echo signals as reflection waves from the inside of said organism of the ultrasonic continuous waves transmitted from said plurality of micro vibrators;

delay adding means for respectively delaying said plurality of received echo signals in accordance with their deflection angles and converging states and for adding said plurality of delayed echo signals;

detecting means for detecting an output signal of said delay adding means to detect a doppler signal; and frequency analyzing means for frequency analyzing said doppler signal.

9. A meter according to claim 4, wherein said detecting means comprises an orthogonal detector for orthogonally detecting the output signal of the delay adding means after completion of adding of said plurality of delayed echo signals.

10. A meter according to claim 4, further comprising a display unit for displaying an analysis result of said frequency analyzing means.

11. A meter according to claim 4, wherein said switch means comprises a matrix switch which includes said plurality of switches.

* * * * *